May 26, 1953 W. R. WILSON ET AL 2,640,106
INSTANTANEOUS FREQUENCY MONITOR
Filed May 15, 1950
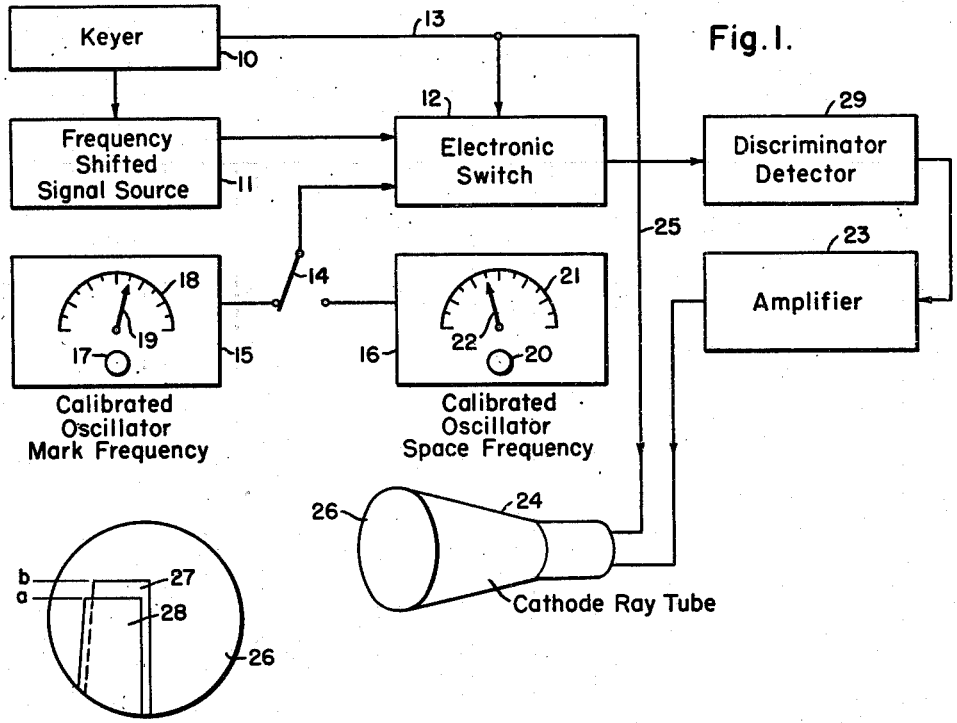
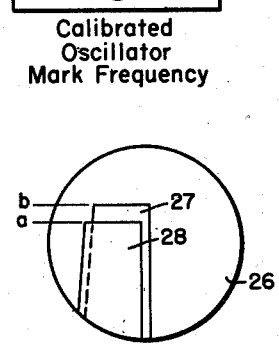
Fig. 2.
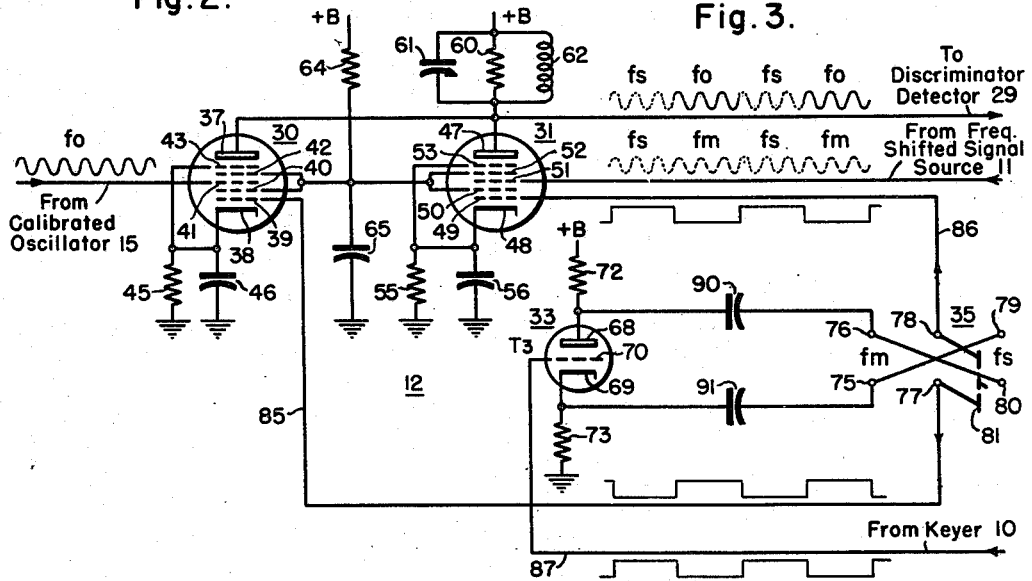
Fig. 3.
fo = Calibrated Oscillator Frequency
fs = Space Frequency or Interval
fm = Mark Frequency or Interval
WITNESSES:
Robert C. Baird
Nw. C. Groome
INVENTORS
William R. Wilson &
Junius B. Reynolds.
BY
F. E. Browder
ATTORNEY Patented May 26, 1953

2,640,106

UNITED STATES PATENT OFFICE 2,640,106

INSTANTANEOUS FREQUENCY MONITOR

William R. Wilson, Ellicott City, Md., and Junius B. Reynolds, Princeton, N. J., assignors to Westinghouse Electric Corporation, East Pittsburgh, Pa., a corporation of Pennsylvania Application May 15, 1950, Serial No. 162,098

4 Claims. (Cl. 178—69)

This invention relates to methods of, and apparatus for, measuring the frequencies of frequency modulated signals, and relates more particularly to the monitoring of frequency-shift keying systems.

In frequency-shift keying systems, a carrier wave is frequency modulated by shifting the carrier frequency a predetermined amount on either side of a normal or mean frequency. When ordinary hand keying is used, the frequency emitted during key-up intervals is known as the space frequency and may be represented instantaneously as equal to the carrier frequency minus the deviation frequency, the amount by which the instantaneous frequency deviates from the carrier frequency. During key-down intervals, the frequency emitted is known as the mark frequency and may be represented instantaneously as equal to the carrier frequency plus the deviation frequency.

At normal keying rates, the emitted frequencies are different from those emitted during hand keying, and the emitted energy is concentrated in sidebands spaced on both sides of the carrier frequency in multiples of the fundamental modulation frequency. The sidebands nearest the space and mark frequencies contain most of the emitted energy, and since at higher keying rates, these sidebands may not fall on the space or mark frequencies, it is difficult to measure the space, mark, or deviation frequencies with a high degree of accuracy.

One method of measuring the space, mark, and deviation frequencies at normal keying rates, which has been proposed, involves the measurement of the output wave form from a discriminator type, frequency modulation detector. When the output of the discriminator is calibrated in terms of output frequency, it is possible to make approximate measurements by observing the output wave form on the screen of a cathode-ray oscilloscope. However, it is not practical to measure this output to the accuracy which is frequently required, and even if such accuracy were possible, with the present state of the art it is difficult to build a circuit with the required stability.

This invention provides for the accurate measurement of the instantaneous frequency of a frequency modulated signal. In one embodiment of the invention for the measurement of space and mark frequencies during frequency-shift keying, the frequency to be measured, and the frequency from a calibrated oscillator operating in the range of the frequency to be measured, is fed to an electronic switch which alternately applies each of the two frequencies to discriminator type detector. The electronic switch passes the signals for a period of time which may be slightly shorter than either the mark or space period. The output of the discriminator is amplified and applied to the vertical plates of a cathode-ray oscilloscope in which the sweep is synchronized with the keying. The resulting image on the oscilloscope screen consists of two separate patterns alternately superimposed one over the other. The amplitude of one will represent the frequency to be measured, while the amplitude of the other will represent the frequency from the calibrated oscillator. The amplitudes of the two patterns are made equal by adjusting the frequency of the calibrated oscillator. At that time, the frequency of the oscillator will be the same as the frequency of the signal being measured, and can be read directly from the calibrated scale of the oscillator.

An object of the invention is to accurately measure the instantaneous frequency of a frequency modulated signal.

Another object of the invention is to accurately measure the instantaneous values of the "mark" and "space" frequencies of a frequency-shift keying system.

Another object of the invention is to provide an accurate, stable monitor for the measurement of the instantaneous frequencies of a frequency modulated signal.

The invention will now be described with reference to the drawing, in which:

Fig. 1 is a schematic block diagram of a frequency monitor embodying the invention, as used for measuring the space and mark frequencies of a frequency-shift keying system;

Fig. 2 illustrates the manner in which the patterns, representing the frequency to be measured and the calibrated frequency, appear on the screen of the oscilloscope of Fig. 1, and Fig. 3 illustrates the circuit of an electronic switch which may be used on our monitor.

The keyer 10 frequency modulates by means of a rectangular wave form, the carrier wave produced by the signal source 11 of a conventional frequency-shift keying system. The output of the source is connected to the input of the electronic switch 12. The keyer 10 is also connected through the connection 13 to the switch 12 for supplying a synchronizing signal thereto, and through the connections 13 and 25 to the cathode ray tube 24. The input of the switch 12 is also adapted to be connected by the manually operated switch 14 to the output of either the calibrated oscillator 15 or the calibrated oscillator 16.

The oscillator 15 is a conventional calibrated oscillator designed to generate a signal with the required accuracy and having a range of frequencies in the range of the mark frequency of the system, and has a knob 17 for adjusting the frequency of the signal it generates, and has the scale 18 and the cooperating indicator 19 for indicating the frequency which the oscillator is adjusted to generate.

The oscillator 16 is a conventional calibrated oscillator designed to generate a signal with the required accuracy and having a range of frequencies in the range of the space frequency of the system, and has a knob 20 for adjusting the frequency of the signal it generates, and has the scale 21 and the cooperating indicator 22 for indicating the frequency which the oscillator is adjusted to generate.

The output of the switch 12 is connected to the input of the conventional discriminator detector 29, the output of which is connected to the input of the high gain amplifier 23. The output of the amplifier 23 is connected to the vertical plates of the conventional cathode-ray oscilloscope 24, the sweep of the oscilloscope being synchronized, through the connections 13 and 25 to the keyer 10.

The electronic switch 12, illustrated schematically in Fig. 3, comprises two pentagrid tubes 30 and 31, a triode tube 33 and a double pole-double throw switch 35.

The tube 30 has a plate 37, a cathode 38, and grids 39, 40, 41, 42 and 43. A biasing circuit comprising a resistance 45 and a condenser 46 is connected between the cathode 38 and ground. The grids 40 and 42 are connected together and the grid 43 is connected to the cathode 38. The output from the calibrated oscillator 15 (Fig. 1) is connected to the grid 41.

The tube 31 has a plate 47, a cathode 48, and grids 49, 50, 51, 52 and 53. A biasing circuit comprising a resistance 55 and a condenser 56 is connected between the cathode 48 and ground. The grids 50 and 52 are connected together and the grid 53 is connected to the cathode 48. The output from the frequency shifted signal source 11 (Fig. 1) is connected to grid 51.

The plates 37 and 47 are supplied with suitable B+ potential across the impedance comprising resistor 60, capacity 61 and inductance 62 carried in parallel. The screen grids 40 and 50 are supplied with suitable B+ potential across resistor 64. The condenser 65 is a by-pass for the screen grids 40 and 50. The output from the plates 37 and 47 is connected to the input of the discriminator detector 22 (Fig. 1).

The triode tube 33 functions as an inverter and it comprises a plate 68, a cathode 69, and a grid 70. The plate 68 is connected to a suitable source of B+ potential through a resistor 72. The cathode is connected to ground through an unbypassed resistor 73.

The double pole-double throw switch 35 comprises three pairs of contacts or terminals 75, 76, 77, 78 and 79, 80 and a bridging member 81.

The grid 39 of tube 30 is connected to terminal 77 of switch 35 through conductor 85. The grid 49 of the tube 31 is connected to terminal 78 of the switch 35 through conductor 86.

The output from the keyer 10 (Fig. 1) is connected to the grid 70 of tube 33 through conductor 87. The plate 68 of tube 33 is connected to terminal 76 of switch 35 through coupling capacitor 90. The cathode 69 of tube 33 is connected to terminal 75 of switch 35 through coupling capacitor 91.

The rectangular keying signal from the keyer 10 is passed through the inverter 33 to obtain equal but out of phase keying signals. These signals are in turn applied to the grids 39 and 49 of the tubes 30 and 31, respectively, alternately permitting the tubes 30 and 31 to pass the signals imposed upon the grids 41 and 51. This produces in the plate circuits of the tubes 30 and 31 alternate calibrated oscillator and frequency-shifted signals in synchronism with the keying signals.

With the bridging member 81, of switch 35, bridging terminals 79 and 80, the tube 31 will pass only the "space" interval signals from the frequency shifted source 11 (Fig. 1). With the bridging member 81, of switch 31, bridging terminals 75 and 76, the tube 31 will pass only the "mark" interval signals from the frequency shifted source 11.

In operation, the keyer is actuated to frequency modulate the carrier wave from the signal source 11. The calibrated mark frequency oscillator 15 is operated to supply a signal having a frequency in the range of the mark frequency from the source 11. The electronic switch 12 alternately feeds the signals from the output of the source 11 and from the oscillator 15 into the input of the discriminator detector 29, the output of which is amplified in the amplifier 23, and supplied to the vertical plates of the oscilloscope 24. The keyer 10 supplies the sweep frequencies. The electronic switch 12 passes each signal for a period of time which may be slightly shorter than the mark period.

The resulting image shown on the screen 26 of the oscilloscope will consist of two separate patterns 27 and 28 alternately superimposed one upon the other, as illustrated by Fig. 2, in which the amplitude $a$ of the pattern 28 represents the mark frequency and the amplitude $b$ of the pattern 27 represents the frequency of the signal from the oscillator 15. The control knob 17 of the oscillator 15 is then adjusted until the amplitude $b$ equals the amplitude $a$ at which time the mark frequency will be equal to the frequency of the oscillator 15, which frequency can be read off from the position of the indicator 19 along the calibrated scale 18.

By moving the switch 14 over to disconnect the oscillator 15 from the electronic switch 12, and to connect the oscillator 16 to the electronic switch, the space frequency can be determined following the procedure described in the foregoing. The patterns on the oscilloscope screen will, however, be inverted.

Only that sector of the output voltage range of the discriminator detector 22 corresponding to the desired frequency need be amplified in the amplifier 23. The difference in the amplitude of the two outputs from the detector 29 are magnified in the amplifier 23, and this results in the greatly increased accuracy of the monitor.

Another important advantage provided by this invention is that due to the fact that the discriminator detector output is continuously calibrated, changes in its operating conditions such as de-tuning will have no effect on either accuracy or stability.

While the invention has been described in connection with the monitoring of frequency-shifted keying systems, it is applicable to the monitoring of other types of frequency modulation systems.

We claim as our invention:

1. A monitor for measuring the frequency of a frequency modulated signal source comprising: an oscillator; a detector; switch means for alternately applying the signal from the source and the signal from the oscillator to the input of said detector; means for providing one visual indication of the voltage corresponding to the signal from the source, and for providing a second visual indication of the voltage from the detector corresponding to the signal from the oscillator; control means for adjusting the frequency of the oscillator until the amplitude of the visual indications is the same, and indicator means for determining the frequency of the oscillator.

2. A monitor as claimed in claim 1 in which the indicator means for determining the frequency of the oscillator is a calibrated scale for indicating directly the frequency of its output.

3. A monitor for measuring the frequency of a frequency shift keying system having a keyer comprising: an oscillator; a detector; means for alternately switching the signal from the source and the signal from the oscillator to said detector; a cathode-ray oscilloscope connected to the detector and to the keyer so as to have a sweep synchronizing with the keyer, and to provide patterns on its screen which have amplitudes corresponding to the voltages from the detector resulting from the two signals supplied thereto; means for adjusting the oscillator until the amplitude of the pattern on said screen corresponding to the frequency of its signal is equal to the amplitude of the pattern on said screen corresponding to the frequency of the signal from said source, and means for determining the frequency of the oscillator.

4. A monitor as claimed in claim 3 in which the means for determining the frequency of the oscillator is a calibrated scale for indicating directly the frequency of its output.

WILLIAM R. WILSON.
JUNIUS B. REYNOLDS.

References Cited in the file of this patent

UNITED STATES PATENTS

| Number | Name | Date |
|---|---|---|
| 1,897,204 | Loewe | Feb. 14, 1933 |
| 2,178,074 | Jakel | Oct. 31, 1934 |

FOREIGN PATENTS

| Number | Country | Date |
|---|---|---|
| 891,937 | France | Dec. 17, 1934 |

OTHER REFERENCES

Notes on Audio and Supersonic Frequency Measurements, by A. K. McLaren in Radio, August 1945, pp. 46, 49.